United States Patent
Tanaka (10) Patent No.: US 9,290,058 B2
(45) Date of Patent: Mar. 22, 2016

(54) PNEUMATIC TIRE

(75) Inventor: Susumu Tanaka, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1124 days.

(21) Appl. No.: 13/336,343

(22) Filed: Dec. 23, 2011

(65) Prior Publication Data

US 2012/0160385 A1 Jun. 28, 2012

(30) Foreign Application Priority Data

Dec. 27, 2010 (JP) ................................ 2010-290856

(51) Int. Cl.
| | | |
|---|---|---|
| *B60C 11/12* | (2006.01) | |
| *B60C 11/13* | (2006.01) | |
| *B60C 11/03* | (2006.01) | |

(52) U.S. Cl.
CPC ......... *B60C 11/0306* (2013.04); *B60C 11/1369* (2013.04); *B60C 11/12* (2013.01); *B60C 2011/0344* (2013.04); *B60C 2011/0365* (2013.04); *B60C 2011/0369* (2013.04); *B60C 2011/0372* (2013.04)

(58) Field of Classification Search
CPC ................... B60C 11/0306; B60C 2011/0372; B60C 2011/0344; B60C 11/1369; B60C 11/12; B60C 2011/0369; B60C 2011/0365
See application file for complete search history.

(56) References Cited

U.S. PATENT DOCUMENTS

| | | | | | |
|---|---|---|---|---|---|
| 4,690,189 | A | * | 9/1987 | Bradisse et al. | 152/209.15 |
| 4,819,704 | A | * | 4/1989 | Misawa et al. | 152/209.1 |
| 5,960,845 | A | * | 10/1999 | Wada | 152/209.23 |
| 2006/0137791 | A1 | | 6/2006 | Miyabe et al. | |

FOREIGN PATENT DOCUMENTS

| | | | | |
|---|---|---|---|---|
| JP | 62-268707 | A | * | 11/1987 |
| JP | 02-127105 | A | * | 5/1990 |
| JP | 02-182505 | A | * | 7/1990 |
| JP | 11-263104 | A | * | 9/1999 |
| JP | 2010-173346 | A | * | 8/2000 |
| JP | 2002-019423 | A | * | 1/2002 |
| JP | 2004-262312 | A | | 9/2004 |
| JP | 2008-037139 | A | * | 2/2008 |

OTHER PUBLICATIONS

Machine translation for Japan 2010-173346 (no date).*
Machine translation for Japan 2002-019423 (no date).*
Machine translation for Japan 11-263104 (no date).*
Machine translation for Japan 2008-037139 (no date).*

* cited by examiner

*Primary Examiner* — Steven D Maki
(74) *Attorney, Agent, or Firm* — Birch, Stewart, Kolasch & Birch, LLP (57) ABSTRACT

A pneumatic tire tread includes center lateral grooves inclined to the reverse direction of the belt cords of the outermost belt ply of the belt, a groove width Wyc of the center lateral grooves being from 1.0 to 6.0 mm, shoulder lateral grooves being inclined to the same direction of the belt cords of the outermost belt ply, the shoulder lateral grooves having a narrow-width portion having a groove width Wys1 of from 0.4 to 1.5 mm at a position where it connects to a shoulder circumferential main groove, and a wide-width portion having a groove width Wys2 of from 2.0 to 8.0 mm which is connected to the narrow-width portion and extends beyond the tread ground-contact edge.

6 Claims, 8 Drawing Sheets

PNEUMATIC TIRE

BACKGROUND OF THE INVENTION

1. Field of the Invention

The present invention relates to a pneumatic tire which has improved anti-hydroplaning performance, while preventing degradation of noise performance and steering stability.

2. Description of the Background Art

In general, in order to improve anti-hydroplaning performance of tires, drainage performance is enhanced by increasing groove width and groove depth of tread grooves provided on a tread portion. However, such measures degrade steering stability performance and noise performance on a dry road surface, with reduced pattern rigidity or increased groove volume.

Figure 8:
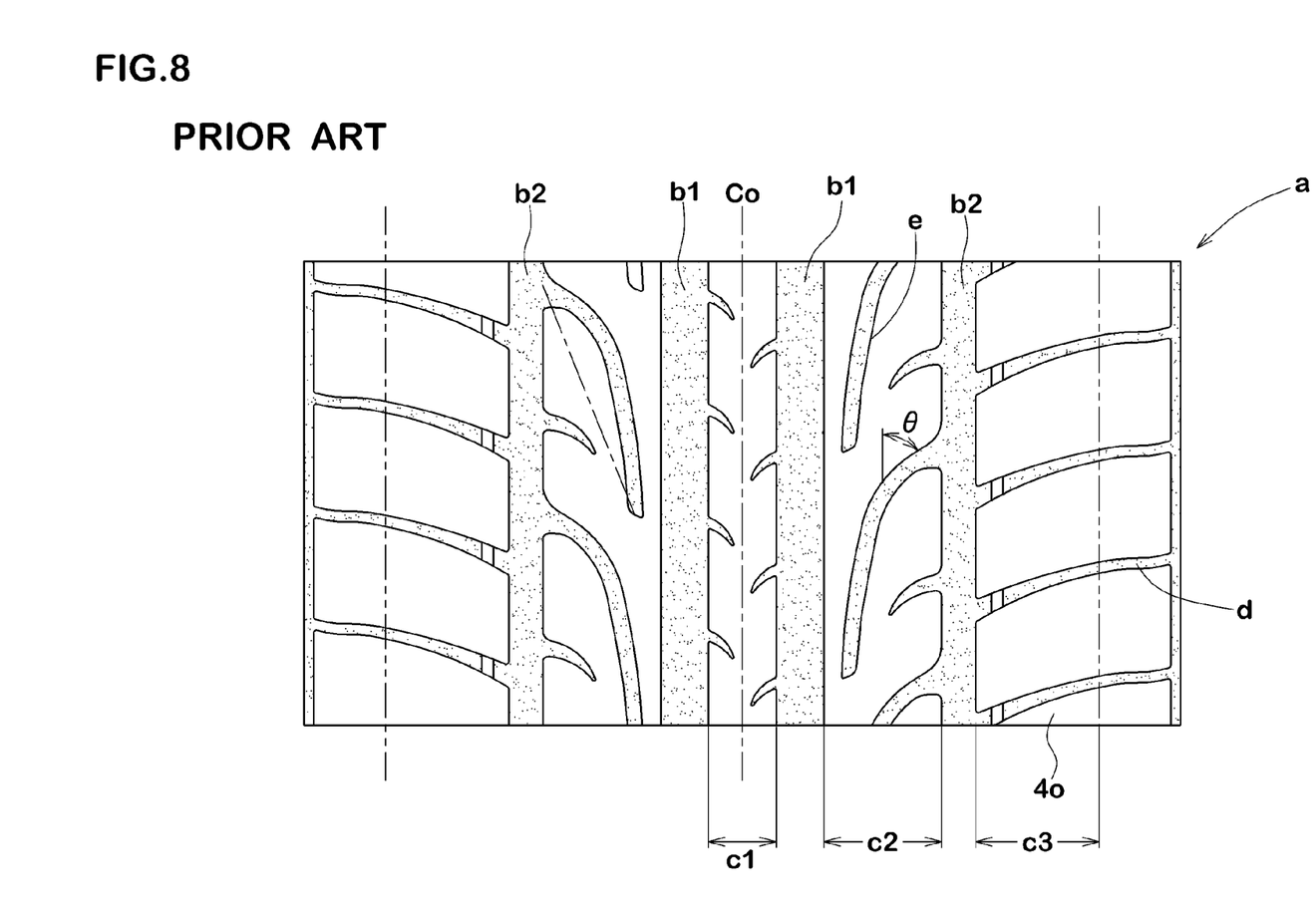
FIG. 8 is a development view showing one example of a tread pattern of a conventional tire.

Japanese Patent Application Publication No. 2004-262312 proposes a tire with tread patterns as shown in FIG. 8. On the tire, a pair of inner circumferential grooves b1 extending on both sides of a tire equator Co and a pair of outer circumferential grooves b2 extending on both outer sides of the inner circumferential grooves are provided in a tread portion "a". With this, the tread portion "a" is divided into a center land portion c1, intermediate land portions c2, and shoulder land portions c3. In addition, the center land portion c1 and the intermediate land portion c2 are formed as a circumferential rib which continuously extends in a tire circumferential direction, and the shoulder land portion c3 is formed as a plurality of blocks sectioned by lug grooves d. In addition, in the intermediate land portion c2 are provided inclined grooves e which extend from the outer circumferential groove b2 to an axial inside of the tire while gradually reducing an angle θ with respect to the tire circumferential direction, and whose inner ends terminate near the inner circumferential groove b1. Angles θ at the tire axial inner and outer ends of the inclined grooves e and a pitch interval between the inclined grooves e, e are regulated.

The tread pattern described above has high land portion rigidity and shows excellent steering stability by the central land portion c1 and the intermediate land portion c2 being formed as the circumferential ribs. In particular, since each inclined grooves e smoothly inclines along a running water line in the intermediate land portion c2, they show excellent anti-hydroplaning performance. In addition, since the inclined grooves e have their ends terminate within the intermediate land portion c2, they ensure high land portion rigidity, and keep steering stability at high level. Furthermore, compressed air from the inclined grooves e is blocked from flowing into the inner circumferential groove b1, air-column resonance in the inner circumferential groove b1 is controlled and noise performance is improved.

However, even with such technologies, the anti-hydroplaning performance has not been improved sufficiently, and thus further improvement is requested.

SUMMARY OF THE INVENTION

An object of the present invention is to provide a pneumatic tire which can improve anti-hydroplaning performance while preventing degradation of noise performance and steering stability performance, basically by forming a block pattern of center circumferential main groove, shoulder circumferential main grooves, center lateral grooves, and shoulder lateral grooves in a tread portion, and improving an inclination of the center lateral groove, the shoulder lateral groove and belt cords of the outermost belt ply.

According to the present invention, a pneumatic tire comprises a tread portion, a carcass comprising at least one carcass ply of cords extending between bead cores in each bead portion through the tread portion and a pair of sidewall portions, and a belt comprising at least one belt ply of belt cords arranged on the axially outward of the carcass in the tread portion, wherein the tread portion is provided with a center circumferential main groove extending on a tire equatorial plane, a pair of shoulder circumferential main grooves arranged on axial outside of the center circumferential main groove, a plurality of center lateral grooves extending from the center circumferential main groove to the shoulder circumferential main grooves and a plurality of shoulder lateral grooves extending from the shoulder circumferential main grooves to at least tread edges, the center lateral grooves are inclined to the reverse direction of the belt cords of the outermost belt ply arranged on the radially outermost side of the belt ply of the belt, with respect to the tire circumferential direction, groove width wyc of the center lateral grooves is from 1.0 to 6.0 mm, the shoulder lateral grooves are inclined to the same direction of the belt cords of the outermost belt ply, with respect to the tire circumferential direction, and the shoulder lateral groove comprises a narrow-width portion having a groove width $Wys1$ of from 0.4 to 1.5 mm at a position where it connects to the shoulder circumferential main groove, and a wide-width portion having a groove width $Wys2$ of from 2.0 to 8.0 mm which is connected to the narrow-width portion and extends beyond the tread ground-contact edge.

Here, the tread edges are the axial outermost edges of the ground contacting patch in a condition that the tire is mounted on a standard wheel rim and inflate to a standard pressure and loaded with a standard load.

The standard wheel rim is a wheel rim officially approved for the tire by standard organization, i.e. JATMA (Japan and Asia), T&RA (North America), ETRTO (Europe), STRO (Scandinavia) and the like. The standard rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, the standard pressure is uniformly defined by 180 kPa.

The standard load is a tire load specified by the standard organization above. For example, the standard load is the "maximum load capacity" in JATMA, the "Load Capacity" in ETRTO, the maximum value given in the above-mentioned table in TRA or the like.

DESCRIPTION OF THE PREFERRED EMBODIMENTS

Figure 1:
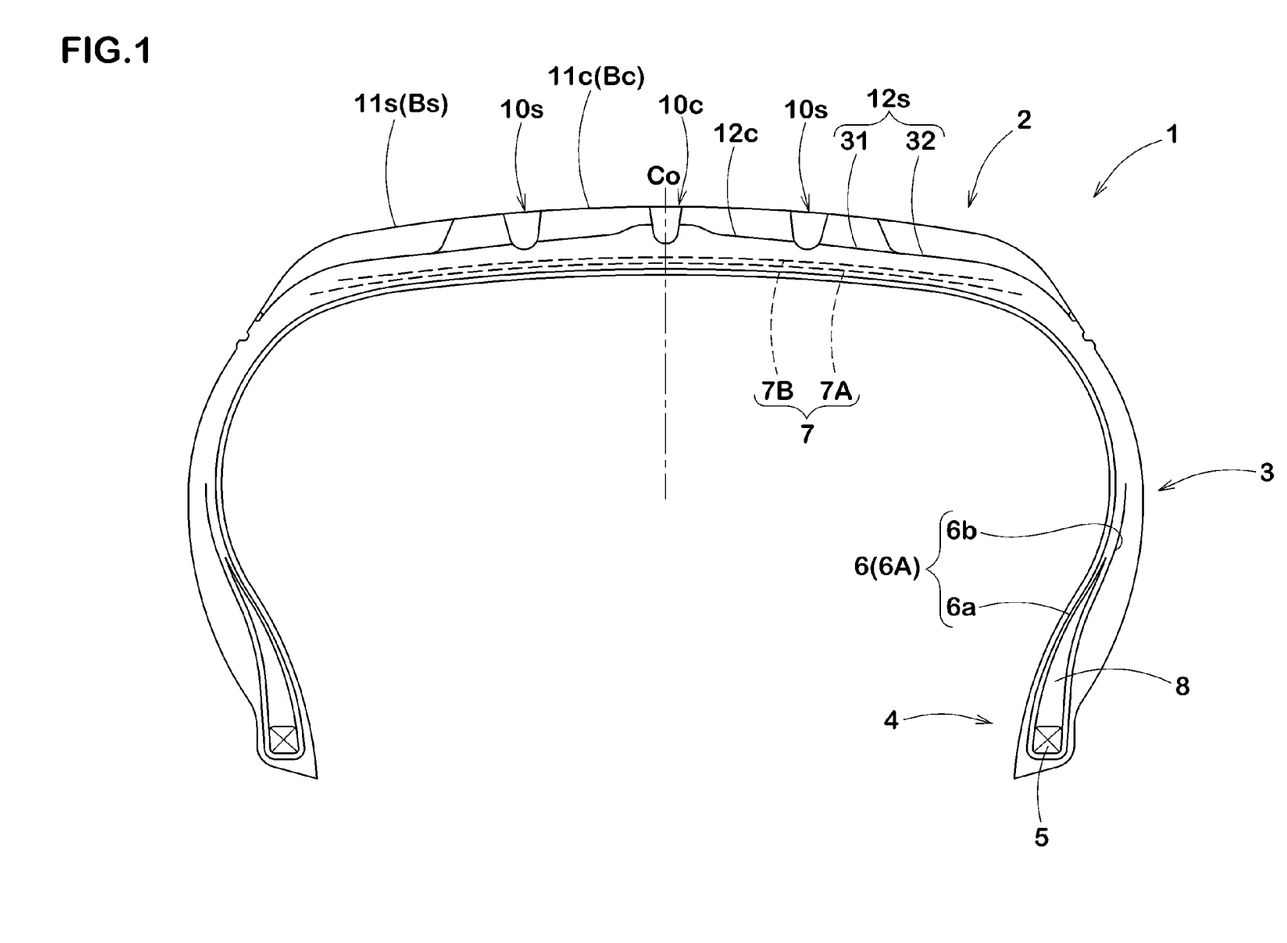
FIG. 1 is a cross sectional view showing one embodiment of a pneumatic tire of the present invention.

An embodiment of the present invention will next be described with reference to the figures. As shown in FIG. 1, a pneumatic tire 1 of the present embodiment comprises a tread portion 2, a pair of sidewall portions 3, a pair of bead portions 4 each with a bead core 5 therein, a toroidal carcass 6 extending from the tread portion 2 through the sidewall portions 3 to the bead core 5 of each bead portion 4, and a belt 7 disposed on the radially outside the carcass 6 in the tread portion 2.

The carcass 6 comprises at least one ply 6A of rubberized organic fiber cords arranged radially at an angle in the range of from 70 to 90 degrees with respect to the a circumferential direction of the tire. The carcass ply 6A extends between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A. The tapered bead apex 8 is disposed between the main portion 6a and the turnup portion 6b of the carcass ply 6A.

Figure 3:
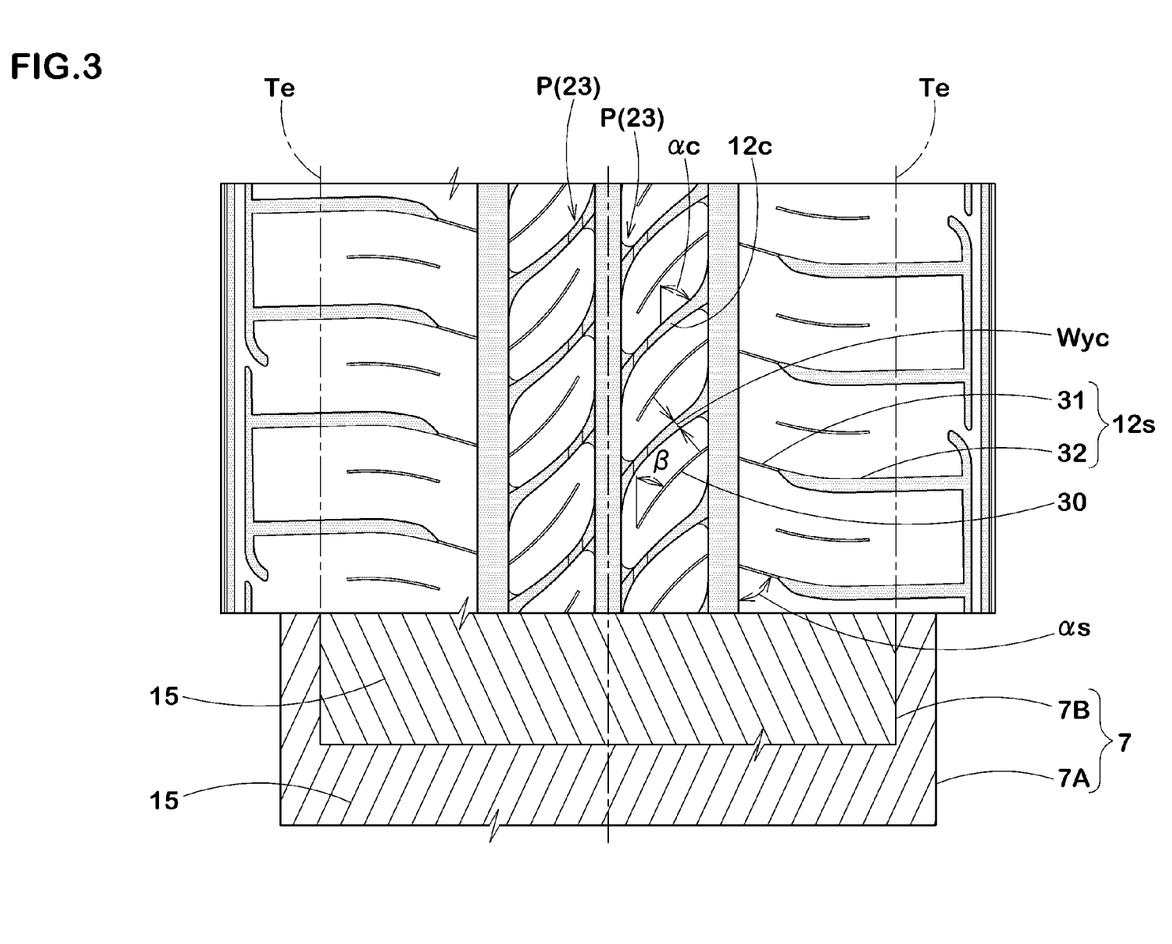
FIG. 3 is a development view showing a relationship of the tread pattern and an inclination of belt cords.

The belt 7 comprises at least one ply of belt cords laid at an angle of from 10 to 35 degrees with respect to the circumferential direction of the tire. In this embodiment, the belt 7 consists of two cross belt plies 7A and 7B of steel cords. As shown in FIG. 3, the belt plies 7A, 7B are laid so that the belt cords 15 of each ply 7A, 7B are crossed each other.

Figure 2:
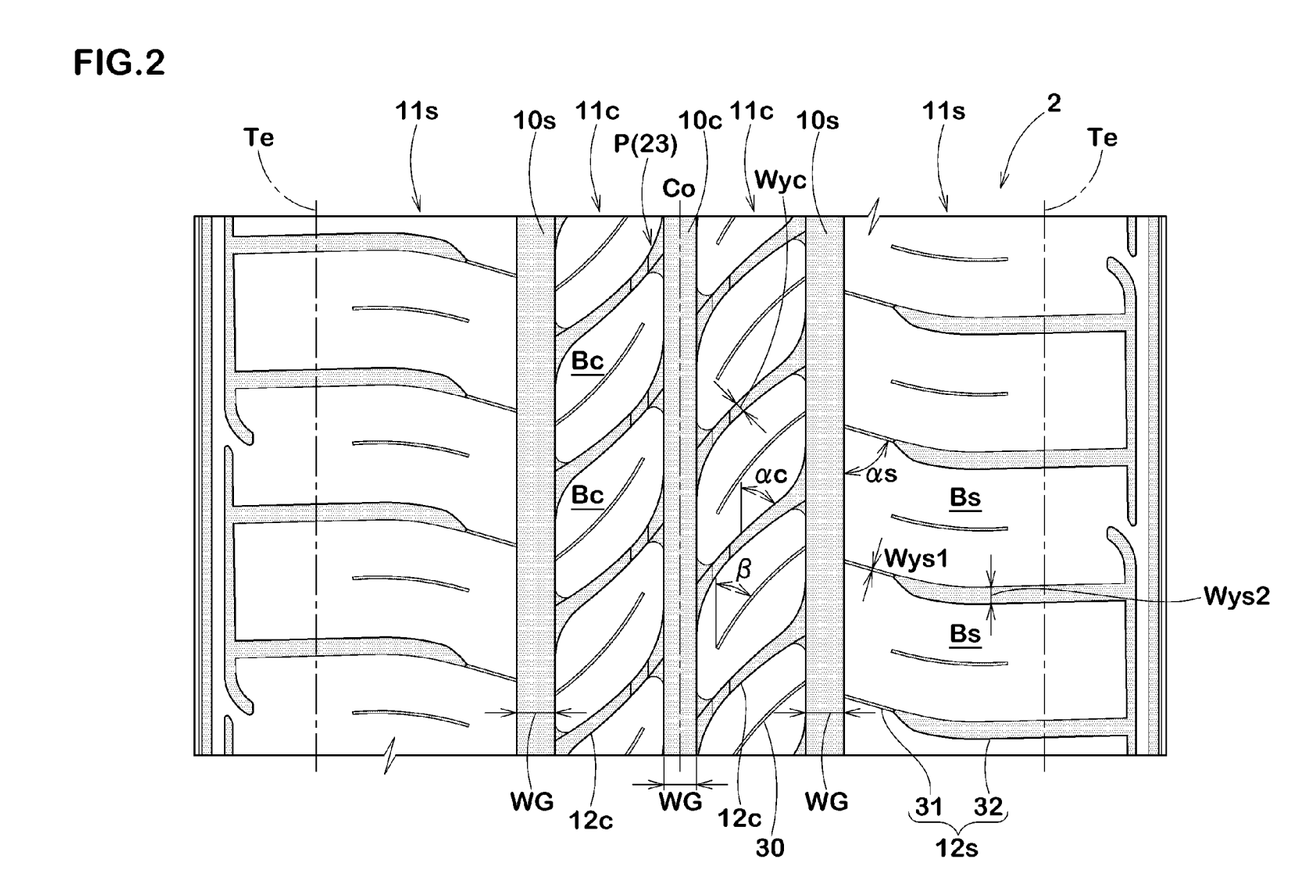
FIG. 2 is a development view showing one embodiment of a tread pattern thereof.

As shown in FIG. 2, the tread portion 2 are provided with a center circumferential main groove 10c extending on a tire equatorial plane Co and a pair of shoulder circumferential main grooves 10s arranged on both outer sides of the center circumferential main groove 10c. With this, the tread portion 2 is divided into a pair of center land portions 11c between the center circumferential main groove 10c and the shoulder circumferential main grooves 10s, and a pair of shoulder land portions 11s located more outwardly in a tire axial direction than the shoulder circumferential main grooves 10s.

Figure 4A:
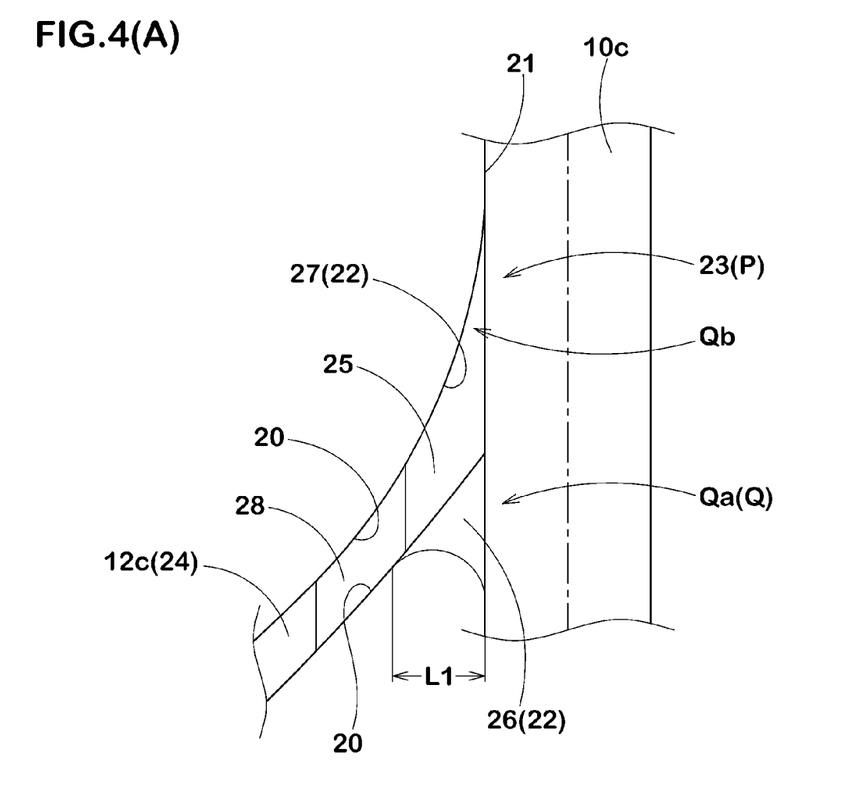
FIG. 4A is a partial enlarged view showing an intersection of a center lateral groove and a center circumferential main groove.
Figure 4B:
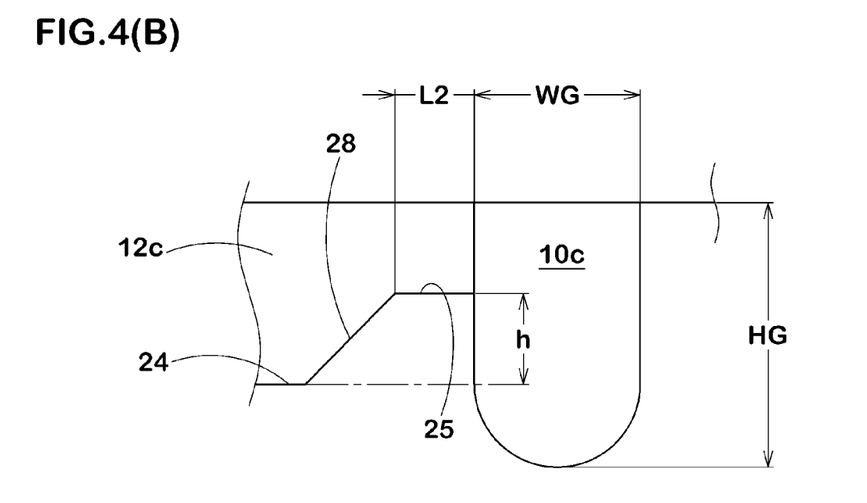
FIG. 4B is a cross sectional view thereof.

The center circumferential main groove 10c and the shoulder circumferential main grooves 10s have groove width WG of not less than 6.0 mm. The groove width WG is preferably set in a range of from 6.0 to 18.0 mm, and a groove depth HG (shown in FIG. 4) is preferably set in a range of from 6.0 to 10.0 mm. In terms of drainage performance, as in the embodiment, a straight groove extending linearly and continuously is preferable for the center circumferential main groove 10c and the shoulder circumferential main grooves 10s.

The center land portion 11c is divided into a plurality of center blocks Bc by center lateral grooves 12c which extend from the center circumferential main groove 10c to the shoulder circumferential groove 10s. In addition, the shoulder land portion 11s is also divided into a plurality of shoulder blocks Bs by shoulder lateral grooves 12s which extend outwardly from the shoulder circumferential main grooves 10s in the tire axial direction over tread edges Te.

As shown in FIG. 3, the center lateral grooves 12c are formed as inclined grooves with a groove width wyc of from 1.0 to 6.0 mm and inclined with respect to the tire circumferential direction. The inclination of the center lateral grooves 12c with respect to the tire circumferential direction is set in the reverse direction of the belt cords 15 of the outermost belt ply 7B which is arranged on the radially outermost in the belt 7. In FIG. 3, while the belt cords 15 of the outermost belt ply 7B inclines diagonally left up, the center lateral grooves 12c incline diagonally right up. For convenience, the belt cords 15 of the outermost belt ply 7B may be referred to as the outer belt cords 15, in some cases.

Now, if the inclination of the center lateral grooves 12c is the same as that of the outer belt cords 15, rigidity of the center land portion 11c tends to degrade, for example, deformations may easily occur on the groove bottoms of the center lateral grooves 12c. In contrast, if the inclination of the center lateral grooves 12c is reverse to that of the outer belt cords 15, rigidity of the center land portion 11c can be improved, for example, deformations may not easily occur on the groove bottoms of the center lateral grooves 12c. Specifically, in the center land portion 11c with great contact pressure, rigidity degradation due to the block pattern can be controlled, and thus high rigidity can be ensured. Consequently, the anti-hydroplaning performance and the steering stability performance can be balanced at a higher level. In contrast, balancing of the anti-hydroplaning performance and the steering stability performance at a higher level cannot be achieved, such as poor drainage performance when the groove width wyc of the center lateral grooves 12c is less than 1.0 mm, or, poor pattern rigidity, by contraries, when the groove width wyc exceeds 6.0 mm.

An inclination Angle αc of the center lateral grooves 12c with respect to the tire circumferential direction is preferably set in the range of from 30 to 70 degrees. It is also preferable that the angle αc gradually increases to the axially outer side of the tire in this range. Although it is preferable in terms of the drain performance that the angle αc is less than 30 degrees, it leads to excessive degradation of the circumferential pattern rigidity. In contrast, if the angle exceeds 70 degrees, the drainage performance excessively degrades, which makes it impossible to balance the anti-hydroplaning performance and the steering stability performance at a high level. From such a standpoint, the angle αc is preferably set not less than 35 degree, or not more than 60 degrees. In addition, it is advantageous to the drainage performance if the angle αc gradually increases axially outwardly, because the center lateral grooves 12c are closer to the running water line. Yet, it is also advantageous to the steering stability performance because the angle of intersection with the outer belt cords 15 gradually increases axially outwardly as well, and the pattern rigidity also increases accordingly.

Figure 5:
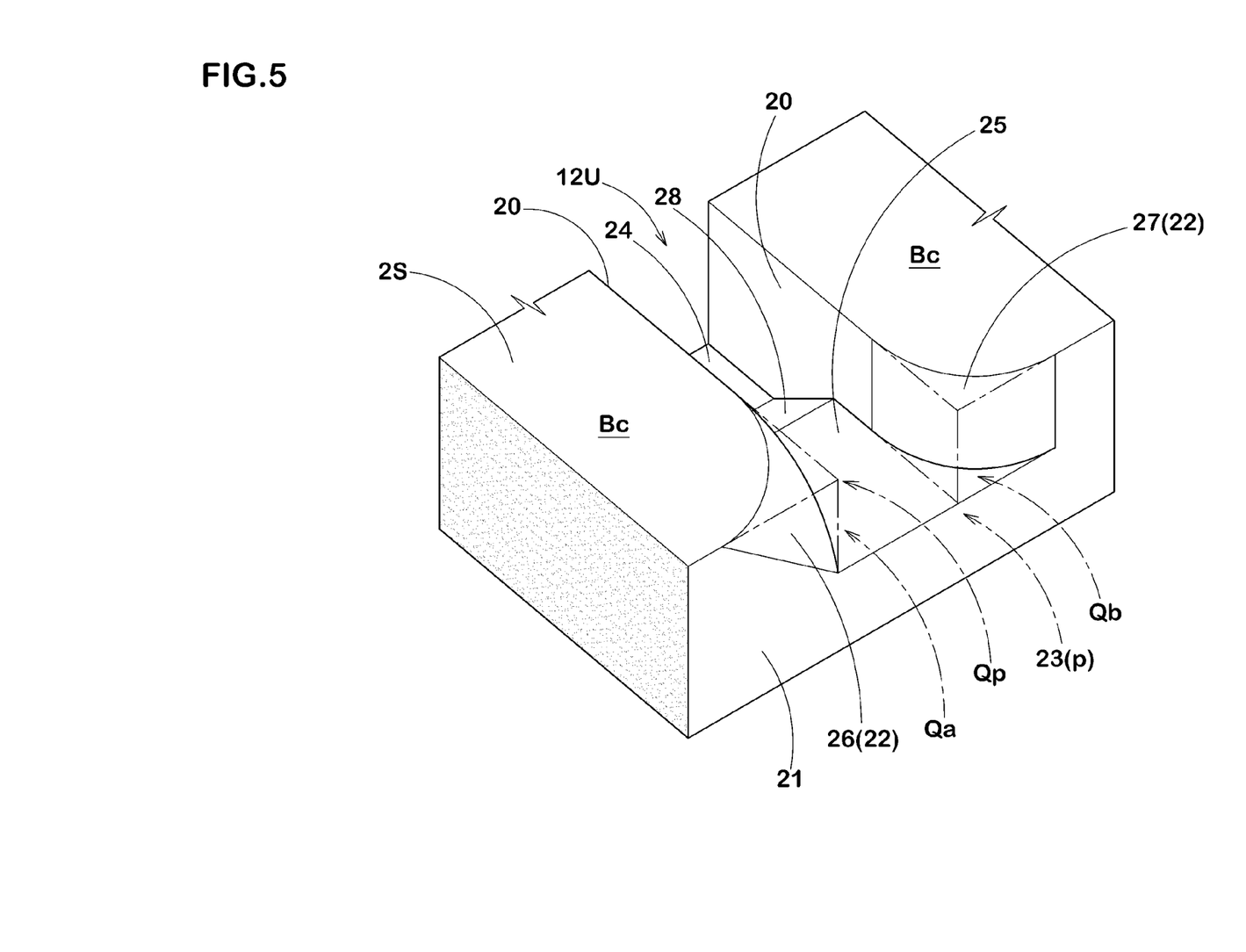
FIG. 5 is a partial perspective view of the intersection.

As shown in FIG. 4 and FIG. 5, a widened portion 23 and a tie-bar portion 25 are provided at an intersection P of the center lateral groove 12c with the center circumferential main groove 10c. The widened portion 23 comprises a chamfered portion 22 which arcuately cuts out a corner Q between a groove wall 20 of the center lateral groove 12c and a groove wall 21 of the center circumferential main groove 10c so that the groove width of the center lateral groove 12c increases at the intersection P. In the embodiment, a chamfered portion 22 with an inclined surface 26 is provided at a corner Qa on an acute side where the groove wall 20 intersects the groove wall 21 at an acute angle. The chamfered portion 22 with the inclined surface 26 is formed by cutting out in almost triangular pyramid manner a vertex Qp where the groove wall 20, the groove wall 21, and a tread surface 2S intersect. In contrast, a chamfered portion 22 with a cylindrical surface 27 is provided at a corner Qb on an obtuse side where the groove wall 20 and the groove wall 21 intersect at an obtuse angles. The chamfered portion 22 with the cylindrical surface 27 is formed by cutting out the corner Qb in almost triangular prism manner.

In addition, the tie-bar portion 25 protrudes from the groove bottom 24 of the center lateral groove 12c up to a certain height in the widened portion 23. The tie-bar portion 25 of the embodiment smoothly connects to the groove bottom 24 via a slope-shaped connecting portion 28 whose height from the groove bottom 24 gradually decreases axially outwardly. The tie-bar portion 25 reduces any difference in rigidity of the center block Bc and the center lateral groove 12c. In addition, by coupling the center blocks Bc, BC which are adjacent in the tire circumferential direction, the tie-bar portion 25 increases rigidity of the center land portion 11c, thus further improving the steering stability performance. The tie-bar portion 25 also dampens pumping sound due to deformation of the center lateral groove 12c, and controls excitation of air-column resonance sound of the center circumferential main groove 10c, thereby enabling noise reduction. In addition, the widened portion 23 controls degradation of the drainage performance while controlling reduction of the groove volume due to formation of the tie-bar portion 25, and maintaining the benefits of the tie-bar portion 25. In addition, as the connecting portion 28 smoothens any rigidity change, the benefits of the tie-bar portion 25 are further enhanced. In addition, a tire axial length L1 of the widened portion 23 is preferably set in a range of from 0.8 to 1.2 times a tire axial length L2 of the tie-bar portion 25, and the height h of the tie-bar portion 25 from the groove bottom 24 is preferably set in a range of from 1.5 to 4.0 mm.

In this embodiment, the center block Bc is provided with a center sipe 30 which extends from the shoulder circumferential main groove 10s to the axially inward of the tire in the same inclination direction as the center lateral grooves 12c, and whose axially inner end terminates within the center block Bc. The center sipe 30 control generation of uneven wear, by relatively reducing block rigidity of the center blocks Bc axially outwardly. In addition, it is preferable that angle β of the center sipe 30 with respect to the tire circumferential direction gradually increases axially outwardly, as with the center lateral grooves 12c. In particular, preferably, the angle β at the axial inner end of the center sipe 30 is smaller than a minimum value of the angle αc of the center lateral groove 12c to the tire circumferential direction. This can provide the center sipes 30 with flexibility to the tilt direction of the outer belt cords 15, while controlling any biased deformation at the corner Qa on the acute side.

The shoulder lateral grooves 12s are formed as an inclined groove which inclines in the same direction as the outer belt cords 15 and extends in the tire circumferential direction. Furthermore, the shoulder lateral groove 12s is formed of a narrow-width portion 31 which connects to the shoulder circumferential main groove 10s and whose groove width Wys1 is 0.4 to 1.5 mm, and a wide-width portion 32 which connects to the narrow-width portion 31 and whose groove width Wys2 extending over the tread ground-contact edge Te is 2.0 to 8.0 mm.

Such shoulder lateral grooves 12s prevent compressed air from the shoulder lateral groove 12s from flowing into the center circumferential main grooves 10s and exciting air-column resonance sound, and improves the noise performance, because its narrow-width portion 31 communicates with the shoulder circumferential main groove 10s. In addition, as rigidity improves in a part of the narrow-width portions 31, degradation of riding comfort is concerned. However, since the shoulder lateral grooves 12s are in the same direction as the tilt direction of the outer belt cords 15, rigidity of the shoulder land portions 11s is alleviated and the riding comfort is ensured.

In addition, as the wide-width portions 32 connect to the narrow-width portions 31 in the shoulder lateral grooves 12s, the drainage performance is ensured. In addition, when the groove width Wys1 of the narrow-width portion 31 falls below 0.4 mm, the drainage performance becomes poor. In contrast, when it exceeds 1.5 mm, the effect of improving noise performance becomes poor. In addition, when the groove width Wys2 of the wide-width portion 32 falls below 2.0 mm, the drainage performance becomes poor. In contrast, when it exceeds 8.0 mm, rigidity of the shoulder land portions 11s excessively degrades, not only leading to degradation of the steering stability performance and reduction of the uneven wear performance such as heel and toe wear and the like, but also adversely affecting the noise performance, such as increased pumping sound or pitch sound and the like.

In addition, the angle αs with respect to the tire circumferential direction of the shoulder lateral grooves 12s is preferably set in a range of from 60 to 90 degrees. Furthermore, preferably, the angle αs gradually increases axially outwardly before reaching the tread ground-contact edge Te. When the angle as falls below 60 degrees, the effect of improving the riding comfort can no longer be adequately achieved because of the shoulder lateral grooves 12s being in the same direction as the tilt direction of the outer belt cords 15, and the uneven wear performance is also affected adversely. In addition, as the angle (s gradually increases axially outwardly, the pattern rigidity also increases, to advantage of the steering stability performance because the angle of intersection with the outer belt cords 15 increases.

So far particularly preferred embodiments of the present invention have been described in detail. However, the present invention is not limited to the embodiments as shown, and may be modified to various aspects and performed.

Comparative Test:

Radial tires (195/65R15) for passenger vehicles with an internal structure shown in FIG. 1 were prototyped with a tread pattern shown in FIG. 2 as a standard pattern. Then, hydroplaning performance, noise performance, steering stability performance, and riding comfort of each tire was tested. Each tire had the identical internal structure.

<Tire Internal Structure>
  Carcass Ply
    Number of plies—1 ply
    carcass cord—1670dtex/2 (polyester)
    Number of cords—50 (cord/5 cm)
    Cord angle—90° (with respect to the tire equator)
  Belt
    Number of plies—2 plies
    Belt cord—1×3×0.27 (steel)
    Number of driven cords—40 (cord/5 cm)
    cord angle—+20°/−20° (with respect to the tire equator)
    Number of cords: 40 cords/5 cm In addition, also in the tread pattern, each tire has substantially the same specification, except for anything other than those listed in Table 1. For the groove width, the groove depth of the shoulder circumferential main groove and the center circumferential main groove, the groove formation position, and the groove depth of the center lateral groove and the shoulder lateral groove, the circumferential pitch interval and the like, each tire also has substantially same specifications. A testing method will be described as follows.

(1) Hydroplaning Performance:

In the hydroplaning performance, a Japanese 2000 cc FF passenger car provided with an assembly of a wheel (15×6JJ) and a test tire inflated to 200 kPa as all the four wheels was run along a 100 meter radius circle on an asphalt road partially provided with a 5 mm-depth, 20 m-long water pool, and the lateral acceleration (lateral G) during running in the water pool was measured at the front wheels, gradually increasing the speed entering into the water pool, to obtain the average lateral acceleration for the speed range of from 50 to 80 km/h. The results are indicated in table 1 by an index based on the comparative example 1 being 100, wherein the larger is better.

(2) Noise Performance

The vehicle described above was run at a speed of 60 km/H on the road noise measuring path (asphalt rough surface path). Noise inside the vehicle then according to the driver's sensory rating is indicated by a ten-point method with the comparative example 1 being 6 points. The larger a numeric value is, the better the noise performance is.

(3) Steering Stability Performance and Riding Comfort

The above vehicle was run on the asphalt tire test course. The steering stability performance such as handle response, feeling of rigidity, grip and the like, and riding comfort performance are indicated by a ten-point method with the comparative example 1 being 6 points, based on the driver's sensory rating. The larger a numeric value is, the better the steering stability and riding comfort are.

TABLE 1

Figure 6:
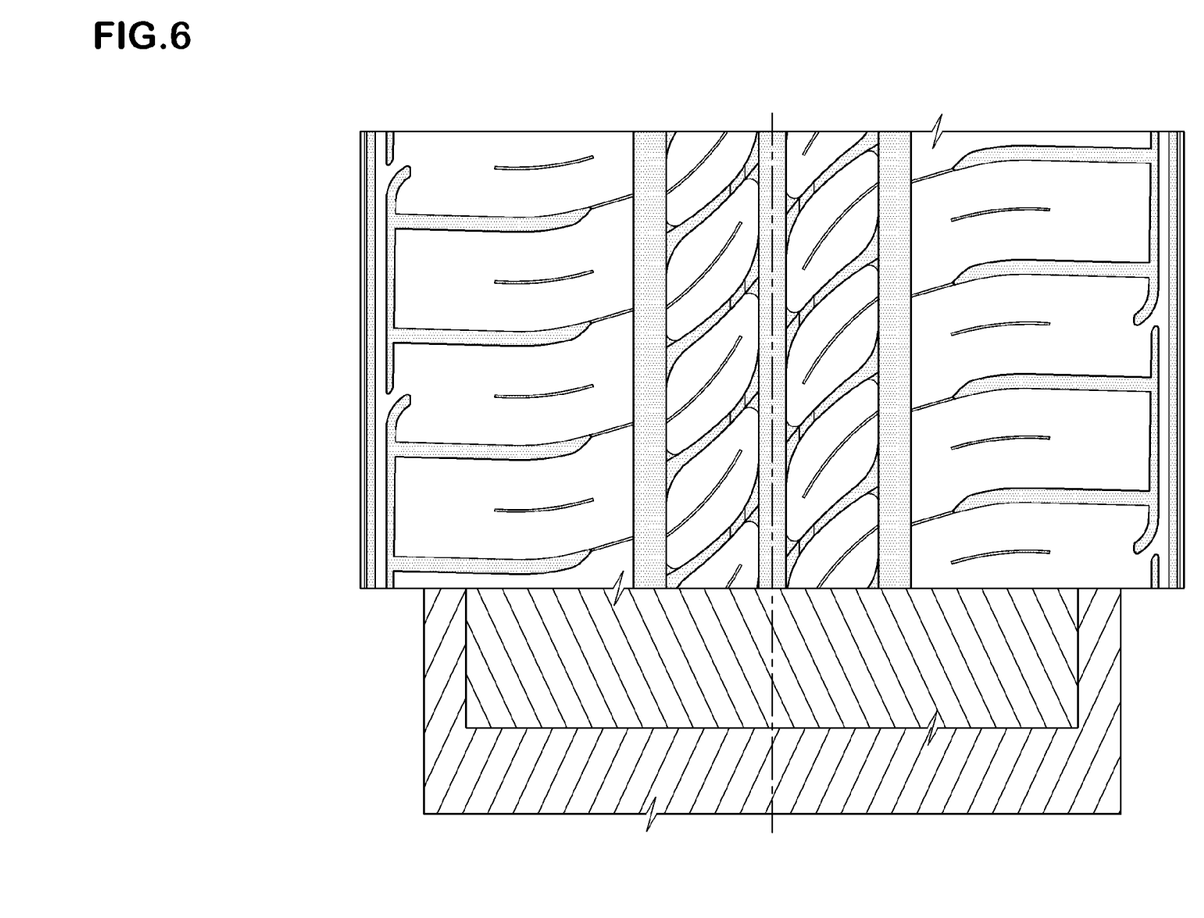
FIG. 6 is a development view showing a tread pattern of a comparison example 1 of Table 1.
Figure 7:
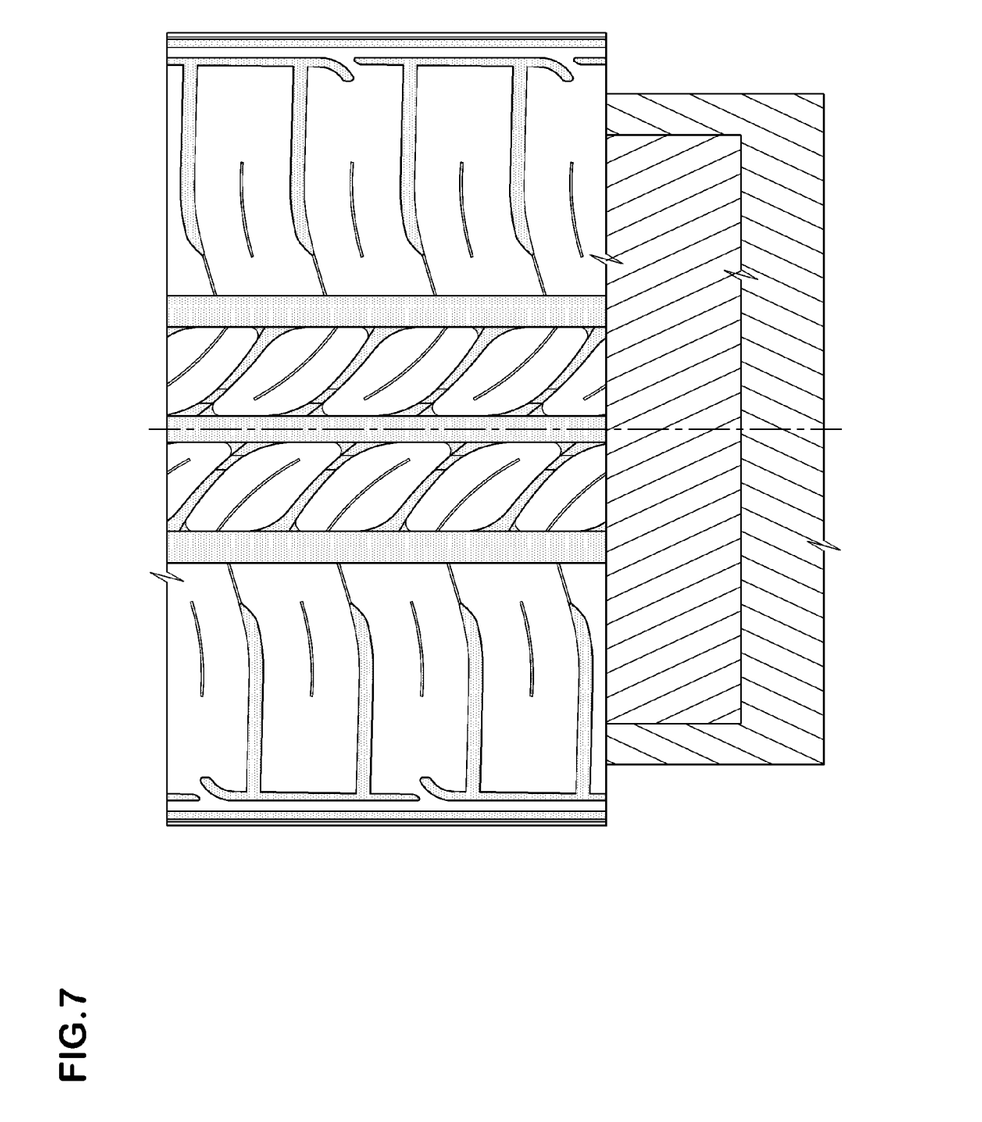
FIG. 7 is a development view showing a tread pattern of a comparison example 2 of Table 1.

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Pattern shape | FIG. 6 | FIG. 7 | FIG. 6 | FIG. 3 | FIG. 3 | FIG. 3 | FIG. 3 |
| Center lateral groove |  |  |  |  |  |  |  |
| Condition of inner end *1 | Penetrating | Penetrating | Closed | Closed | Penetrating | Penetrating | Penetrating |
| Groove width Wyc <mm> | 2.5 | 2.5 | 2.5 | 2.5 | 0.8 | 6.5 | 2.5 |
| inclination direction *2 | Reverse direction | Same direction | Reverse direction | Reverse direction | Reverse direction | Reverse direction | Reverse direction |
| Cord angle $\alpha c$ <degrees> | 45 | 45 | 45 | 45 | 45 | 45 | 45 |
| Shoulder lateral groove |  |  |  |  |  |  |  |
| Groove width of the narrow-width portion Wys1 <mm> | 1.0 | 1.0 | 1.0 | 1.0 | 1.0 | 1.0 | 0.0 |
| Groove width of the wide-width portion Wys2 <mm> | 5.0 | 5.0 | 5.0 | 5.0 | 5.0 | 5.0 | 5.0 |
| inclination direction *2 | Reverse direction | Reverse direction | Reverse direction | Same direction | Same direction | Same direction | Same direction |
| Cord angle $\alpha s$ <degrees> | 75 | 75 | 75 | 75 | 75 | 75 | 75 |
| Hydroplaning performance | 100 | 100 | 90 | 90 | 90 | 105 | 100 |
| Noise performance | 6 | 6 | 6.5 | 6.5 | 6.5 | 5 | 6 |
| Steering stability performance | 6 | 5 | 6.5 | 6.5 | 6.5 | 5 | 6.5 |
| Riding comfort | 6 | 6.5 | 5 | 5.5 | 5.75 | 6 | 5.5 |

|  | Comparative Example 8 | Comparative Example 9 | Comparative Example 10 | Comparative Example 11 | Comparative Example 12 |
|---|---|---|---|---|---|
| Pattern shape | FIG. 3 | FIG. 3 | FIG. 3 | FIG. 3 | FIG. 3 |
| Center lateral groove |  |  |  |  |  |
| Condition of inner end *1 | Penetrating | Penetrating | Penetrating | Penetrating | Penetrating |
| Groove width Wyc <mm> | 2.5 | 2.5 | 2.5 | 2.5 | 2.5 |
| inclination direction *2 | Reverse direction | Reverse direction | Reverse direction | Reverse direction | Reverse direction |
| Cord angle $\alpha c$ <degrees> | 45 | 45 | 45 | 20 | 80 |
| Shoulder lateral groove |  |  |  |  |  |
| Groove width of the narrow-width portion Wys1 <mm> | 2.5 | 2.5 | 2.5 | 2.5 | 2.5 |
| Groove width of the wide-width portion Wys2 <mm> | 5.0 | 1.5 | 9.0 | 5.0 | 5.0 |
| inclination direction *2 | Same direction | Same direction | Same direction | Same direction | Same direction |
| Cord angle $\alpha s$ <degrees> | 75 | 75 | 75 | 75 | 75 |
| Hydroplaning performance | 105 | 90 | 105 | 110 | 95 |
| Noise performance | 5 | 6 | 6 | 5 | 6 |
| Steering stability performance | 6 | 6.5 | 5 | 5 | 6 |
| Riding comfort | 6 | 5 | 6.5 | 6 | 6 |

*1 - "Penetrating" means that the inner end of the center lateral groove penetrates the center circumferential main groove, and "closed" means that the center lateral groove terminates within the center block, without penetrating.
*2 - "Same direction" and "Reverse direction" mean whether the direction of the center lateral groove is same as or reverse to the inclination direction of the belt cords of the outermost belt ply.

TABLE 1-continued

| | Comparative Example 13 | Comparative Example 14 | Example 1 | Example 2 | Example 3 | Example 4 | Example 5 |
|---|---|---|---|---|---|---|---|
| <Pattern shape> | FIG. 3 | FIG. 3 | FIG. 3 | FIG. 3 | FIG. 3 | FIG. 3 | FIG. 3 |
| <Center lateral groove> | | | | | | | |
| condition of inner end *1 | Penetrating | Penetrating | Penetrating | Penetrating | Penetrating | Penetrating | Penetrating |
| Groove width Wyc <mm> | 2.5 | 2.5 | 2.5 | 1.2 | 5.5 | 2.5 | 2.5 |
| Tilt direction *2 | Reverse direction | Reverse direction | Reverse direction | Reverse direction | Reverse direction | Reverse direction | Reverse direction |
| Cord angle αc <degrees> | 45 | 45 | 45 | 45 | 45 | 45 | 45 |
| <Shoulder lateral groove> | | | | | | | |
| Groove width of the narrow-width portion Wys1 <mm> | 2.5 | 2.5 | 1.0 | 1.0 | 1.0 | 1.0 | 1.0 |
| Groove width of the wide-width portion Wys2 <mm> | 5.0 | 5.0 | 5.0 | 5.0 | 5.0 | 2.5 | 7.5 |
| Tilt direction *2 | Same direction | Same direction | Same direction | Same direction | Same direction | Same direction | Same direction |
| Cord angle αs <degrees> | 50 | 90 | 75 | 75 | 75 | 75 | 75 |
| Hydroplaning performance | 105 | 95 | 100 | 99 | 105 | 98 | 105 |
| Noise performance | 6 | 6 | 6 | 6.5 | 6 | 6 | 6 |
| Steering stability performance | 5 | 6 | 6.5 | 7 | 6 | 7 | 6.25 |
| Riding comfort | 6.5 | 5.5 | 6.5 | 6 | 6.5 | 6 | 7 |

| | Example 6 | Example 7 | Example 8 | Example 9 | Example 10 | Example 11 |
|---|---|---|---|---|---|---|
| <Pattern shape> | FIG. 3 | FIG. 3 | FIG. 3 | FIG. 3 | FIG. 3 | FIG. 3 |
| <Center lateral groove> | | | | | | |
| condition of inner end *1 | Penetrating | Penetrating | Penetrating | Penetrating | Penetrating | Penetrating |
| Groove width Wyc <mm> | 2.5 | 2.5 | 2.5 | 2.5 | 2.5 | 2.5 |
| Tilt direction *2 | Reverse direction | Reverse direction | Reverse direction | Reverse direction | Reverse direction | Reverse direction |
| Cord angle αc <degrees> | 35 | 65 | 45 | 45 | 45 | 45 |
| <Shoulder lateral groove> | | | | | | |
| Groove width of the narrow-width portion Wys1 <mm> | 1.0 | 1.0 | 1.0 | 1.0 | 0.5 | 1.5 |
| Groove width of the wide-width portion Wys2 <mm> | 5.0 | 5.0 | 5.0 | 5.0 | 5.0 | 5.0 |
| Tilt direction *2 | same direction | Same direction | Same direction | same direction | Same direction | Same direction |
| Cord angle αs <degrees> | 75 | 75 | 65 | 80 | 80 | 80 |
| Hydroplaning performance | 105 | 99 | 103 | 100 | 100 | 100 |
| Noise performance | 6 | 6 | 6 | 6 | 6 | 6 |
| Steering stability performance | 6.25 | 6.5 | 6 | 6.5 | 6.75 | 6.25 |
| Riding comfort | 6.5 | 6.5 | 7 | 6.25 | 6.25 | 6.75 |

*1 - "Penetrating" means that the inner end of the center lateral groove penetrates the center circumferential main groove, and "closed" means that the center lateral groove terminates within the center block, without penetrating.
*2 - "Same direction" and "Reverse direction" mean whether the direction of the center lateral groove is same as or reverse to the tilt direction of the belt cords of the outermost belt ply.

What is claimed is:

1. A pneumatic tire comprising
   a tread portion,
   a carcass comprising at least one carcass ply of cords extending between bead cores in each bead portion through the tread portion and a pair of sidewall portions, and
   a belt comprising at least one belt ply of belt cords arranged on the axially outward of the carcass in the tread portion, wherein the tread portion is provided with a center circumferential main groove extending on a tire equatorial plane, a pair of shoulder circumferential main grooves arranged on axial outside of the center circumferential main groove, a plurality of center lateral grooves extending from the center circumferential main groove to the shoulder circumferential main grooves and a plurality of shoulder lateral grooves extending from the shoulder circumferential main grooves to at least tread edges, the center lateral grooves are inclined to the reverse direction of the belt cords of the outermost belt ply arranged on the radially outermost side of the belt ply of the belt, with respect to the tire circumferential direction, groove width Wyc of the center lateral grooves is from 1.0 to 6.0 mm, the shoulder lateral grooves are inclined to the same direction of the belt cords of the outermost belt ply, with respect to the tire circumferential direction, and the shoulder lateral groove comprises a narrow-width portion having a groove width Wys1 of from 0.4 to 1.5 mm at a position where it connects to the shoulder circumferential main groove, a wide-width portion having a groove width Wys2 of from 2.0 to 8.0 mm which is connected to the narrow-width portion and extends beyond the tread ground-contact edge, a plurality of center blocks are divided by the center circumferential main groove, the shoulder circumferential main grooves, and the center lateral grooves, each center block is provided with a center sipe which extends from the shoulder circumferential main groove in an axially inward direction of the tire and in the same direction as the center lateral grooves, the center sipe has an axially inner end terminating within the center block, the center sipe has an angle β with respect to the tire circumferential direction gradually increasing axially outwardly, and the angle β at the axially inner end of the center sipe is smaller than a minimum value of an angle αc of the center lateral groove with respect to the tire circumferential direction.

2. The pneumatic tire according to claim 1, wherein the angle αc of the center lateral groove is in the range of from 30 to 70 degrees with respect to the tire circumferential direction, and the angle αc gradually increases axially outwardly.

3. The pneumatic tire according to claim 2, wherein an angle αs of the shoulder lateral groove is in the range of from 60 to 90 degrees with respect to the tire circumferential direction, and the angle αs gradually increases axially outwardly till the tread ground-contact edge.

4. The pneumatic tire according to claim 1, wherein an angle αs of the shoulder lateral groove is in the range of from 60 to 90 degrees with respect to the tire circumferential direction, and the angle as gradually increases axially outwardly till the tread ground-contact edge.

5. The pneumatic tire according to claim 1, wherein the center lateral groove comprises a widened portion whose groove width increases by providing with a chamfered portion which arcuately cuts out a corner between the groove wall of the center lateral groove and a groove wall of the center circumferential main groove, and a tie-bar portion which protrudes from a groove bottom up to a certain height in the widened portion.

6. The pneumatic tire according to claim 5, wherein the tie-bar portion is smoothly connected to the groove bottom of the center lateral groove via a connecting portion, and the connecting portion has a height which gradually decreases toward axially outside.

* * * * *